UNITED STATES PATENT OFFICE.

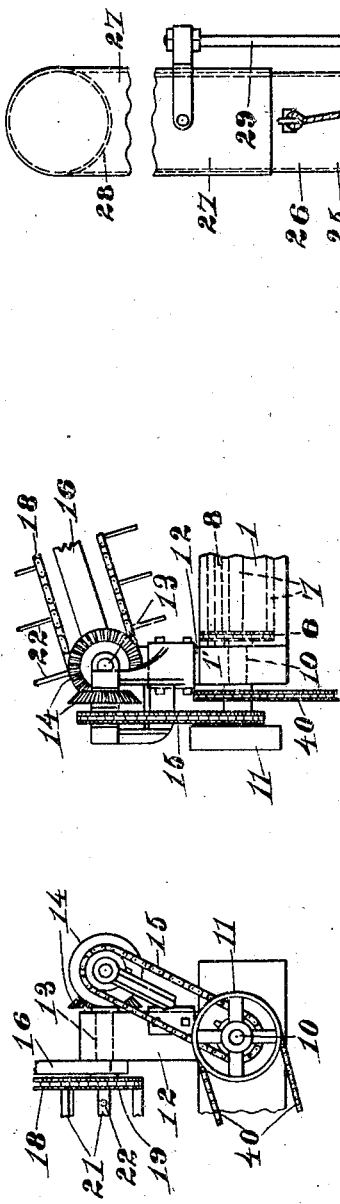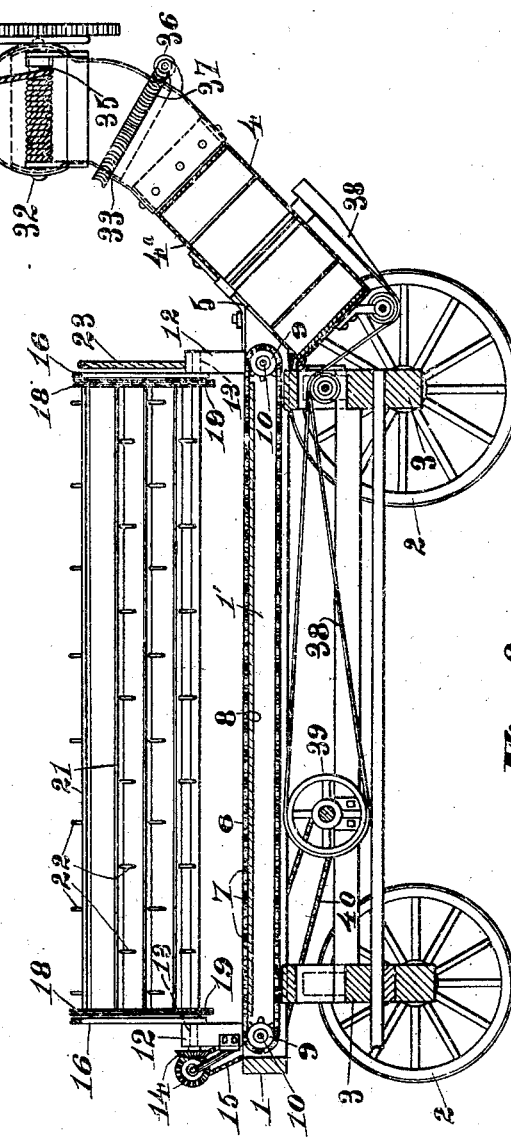

DAVID C. CROOK, OF MINOOKA, ILLINOIS.

HAY-STACKER.

954,171.  Specification of Letters Patent.  Patented Apr. 5, 1910.

Application filed May 9, 1908. Serial No. 431,927.

*To all whom it may concern:*

Be it known that I, DAVID C. CROOK, a citizen of the United States, residing at Minooka, county of Grundy, and State of Illinois, have invented certain new and useful Improvements in Hay-Stackers, of which the following is a specification.

My invention relates to hay-stackers and the object of my invention is to provide a hay-stacker which will remove the hay from the hay-rack and deposit the same in a stack or within a barn.

Other objects will appear hereinafter.

With these objects in view, my invention consists generally in a suitable frame, preferably mounted upon wheels, an endless conveyer extending longitudinally of the frame, a blower fan and an adjustable wind-stacker arranged at the end of the frame, and means for automatically removing the hay from a hay-rack and depositing the same upon said conveyer.

My invention further consists in a hay-stacker having the endless conveyer, the blower and stacker as mentioned, in combination with a frame pivotally connected to the frame of the machine at one side of said conveyer, and extending transversely across the same, and of sufficient length to overhang a hay-rack when positioned beside the stacker, and a conveyer on said frame equipped with means for removing the hay from the rack and depositing the same upon the first said conveyer.

My invention further consists in various details of construction and arrangements of parts, all as will be hereinafter fully described and particularly pointed out in the claim.

Figure 1:
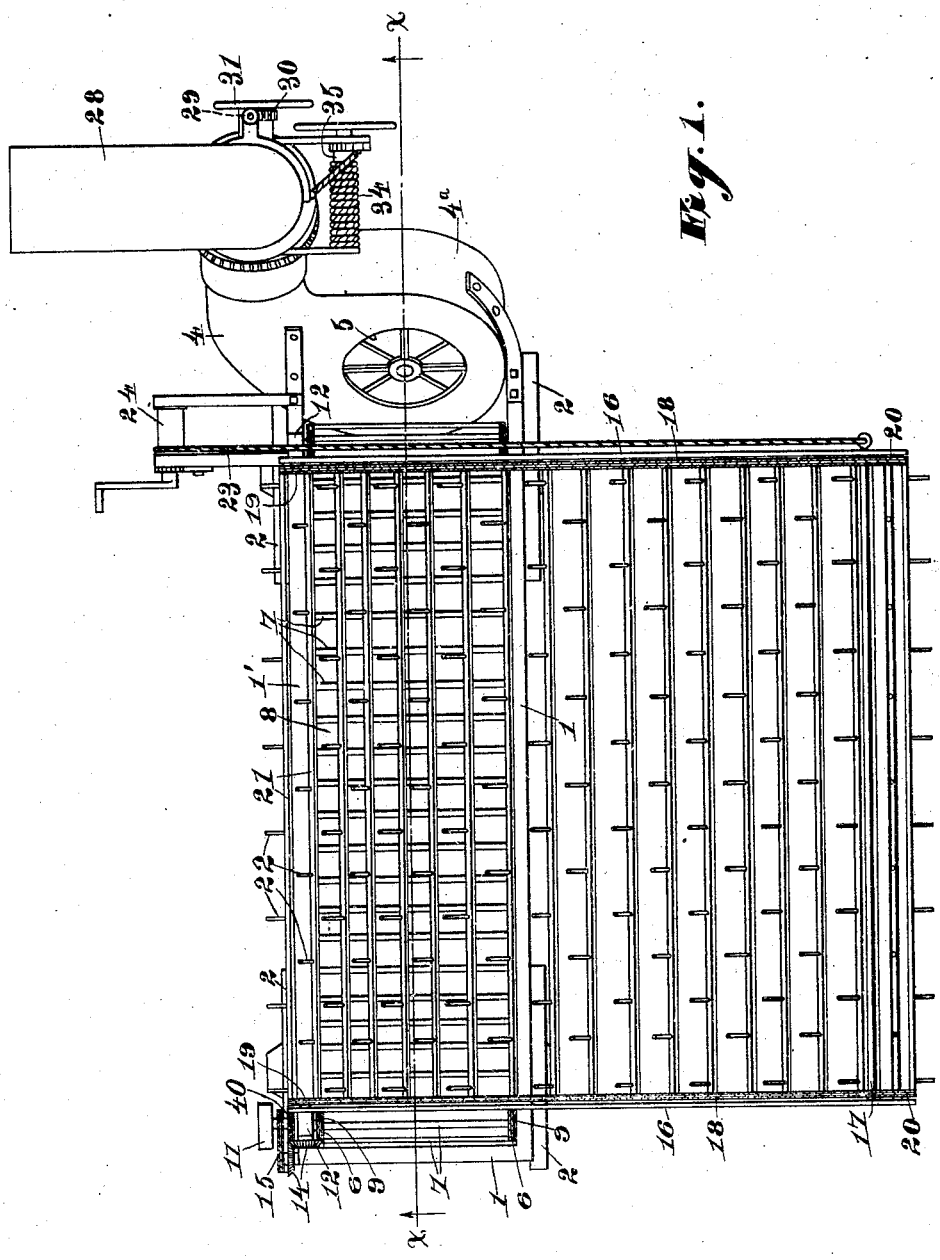
Figure 2:
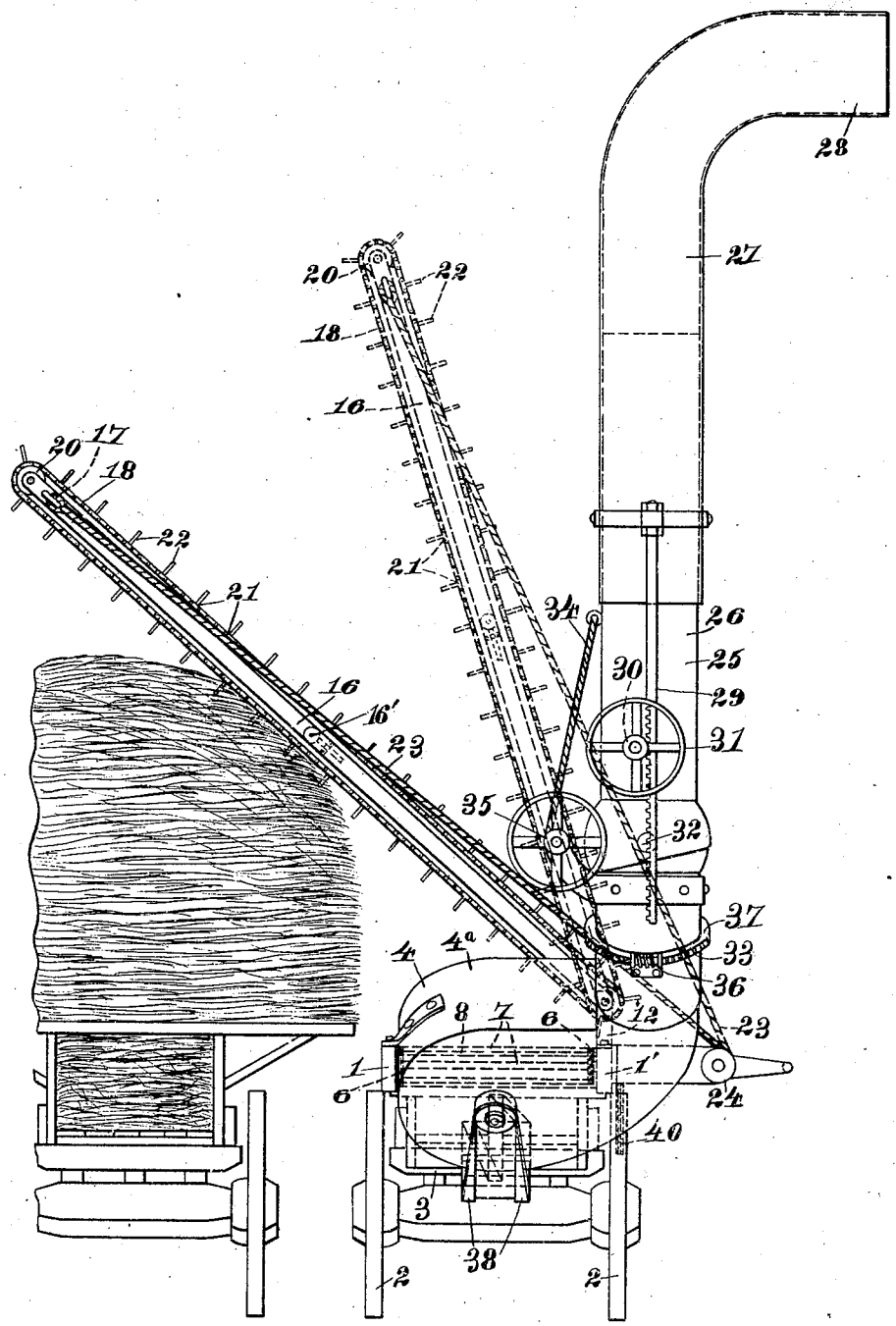

My invention will be more readily understood by reference to the accompanying drawings forming a part of this specification, and in which, Figure 1 is a plan view of a hay-stacker embodying my invention in its preferred form, Fig. 2 is an end elevation thereof, Fig. 3 is a vertical, longitudinal section on the line x—x of Fig. 1, and Figs. 4 and 5 are details of portions of the driving mechanism.

Referring now to the drawings, 1 indicates the horizontal rectangular frame of the device, which is preferably formed of timber, and adapted to rest upon the bolsters of an ordinary farm truck of which 2—2 indicate the wheels, and 3 the body bolster. Arranged at one end of the frame 1 is a fan blower 4 which is preferably arranged at an incline as shown in Fig. 3 with its open side 5 facing inwardly and upwardly. Arranged within the frame 1 is an endless conveyer extending from the face 5 of the fan casing to the opposite end of the device. This comprises a pair of sprocket chains 6—6 connected by the transverse bar 7 arranged at intervals thereon. The conveyer travels longitudinally of the frame, the upper portion passing toward the fan.

8 indicates a bed plate arranged beneath the upper part of the conveyer and upon which, the hay to a great extent rests, the bar 7 drawing the hay along thereon. The chains 6 are arranged upon the sprocket wheels 9—9 fixed to the transverse shafts 10, one of which, is provided with a belt pulley 11 by which it is attached to the engine.

In using the device, the hay rack to be unloaded is driven alongside of the stacker, and by suitable means to be described hereinafter, the hay is removed from the rack and deposited upon the conveyer. The conveyer carries the hay to the fan from whence it is carried through the wind-stacker to the hay-loft.

Hereinafter the term "front" of the machine will be used to designate the side upon which the hay-rack is arranged in unloading.

It will be noted by reference to Fig. 1 that the driving mechanism is arranged upon the back of the machine where it is less liable to become choked by the hay.

Secured to the rear member 1' of the frame and extending upwardly therefrom are a pair of brackets 12—12, in which is mounted a longitudinal shaft 13 which is driven by the beveled gears 14 in turn driven from the shaft 10 by sprocket gearing 15. Pivotally mounted on the shaft 13 and just within the respective bracket members 12 are the arms 16 connected at the outer ends by a brace 17 forming a rigid frame. The frame thus formed is of sufficient length to extend transversely across the bed of the machine and the hay-rack arranged alongside thereof, and is equipped with means for raking the hay from the rack and depositing the same upon the longitudinal conveyer hereinbefore described. The latter comprises a pair of sprocket chains 18 arranged upon sprocket gears 19 and 20 upon the shaft 13 and the ends of the arms 16 respectively, and the rake-bars 21 connecting the same at intervals. When the device is in operation, the raking device or unloader rests upon the top of the hay upon the rack as illustrated in Fig. 2 and the rake-bars 21 being provided with a plurality of pins or teeth 22 draw the hay rapidly from the rack and deposit the same upon the longitudinal conveyer.

23 and 24 indicate a cable and drum respectively, for raising and lowering the raking device or unloader.

As the hay on the longitudinal conveyer approaches the fan casing $4^a$, it is drawn in through the opening 5 by the strong draft or suction created by the fan, and blown through the wind stacker 25. The wind stacker is formed of the telescopic tubular members 26 and 27, the latter of which is preferably provided with an angularly disposed discharge spout or nozzle 28 to enter the window of the hay-loft. Suitable means such as a rack and pinion 29 and 30 is provided for raising the upper end section 27, and a hand wheel 31 is provided for operating the same. The lower section 26 is jointed as at 32 in order that the proper angular inclination may be had, and below the joint 32 it is provided with a swiveled joint 33, by means of which the direction of the spout 28 may be adjusted.

34 and 35 indicate the cable and drum by means of which, the inclination may be adjusted, and 36 and 37 indicate a worm and gear respectively for operating the swivel joint.

Although I have shown and described specific means for adjusting the wind-stacker, it is to be understood that any suitable means may be employed whereby a proper adjustment may be had.

The fan 4 is driven by a belt 38 from a pulley 39 which is in turn driven by sprocket gearing 40 from the shaft of the main drive pulley or band-wheel 11.

It should be noted that the arms 16 are jointed as at 16′ to facilitate folding the device into small compass for transportation.

Having described my invention what I claim as new, and desire to secure by Letters Patent, is:

In a device of the class described a horizontal frame adapted to rest upon a wagon truck, in combination with an endless conveyer arranged within said frame, a pair of upwardly extending brackets arranged upon one side of said frame, an auxiliary frame pivotally mounted on said brackets and of sufficient length to extend across the frame and conveyer and also across a hay rack arranged alongside thereof, a pair of sprocket chains arranged on said auxiliary frame, a plurality of rakes connecting said chains at intervals, said auxiliary frame being pivoted upon said brackets a distance above said horizontal frame slightly greater than the depth of said rakes, and an adjustable wind stacker arranged at one end of said conveyer, substantially as described.

In testimony whereof I have signed my name to this specification in the presence of two subscribing witnesses.

DAVID C. CROOK.

Witnesses:
PETER CROOK,
LEW. J. GASKILL.